L. P. HALLADAY.
BUMPER BAR.
APPLICATION FILED DEC. 1, 1920.
1,377,340. Patented May 10, 1921.
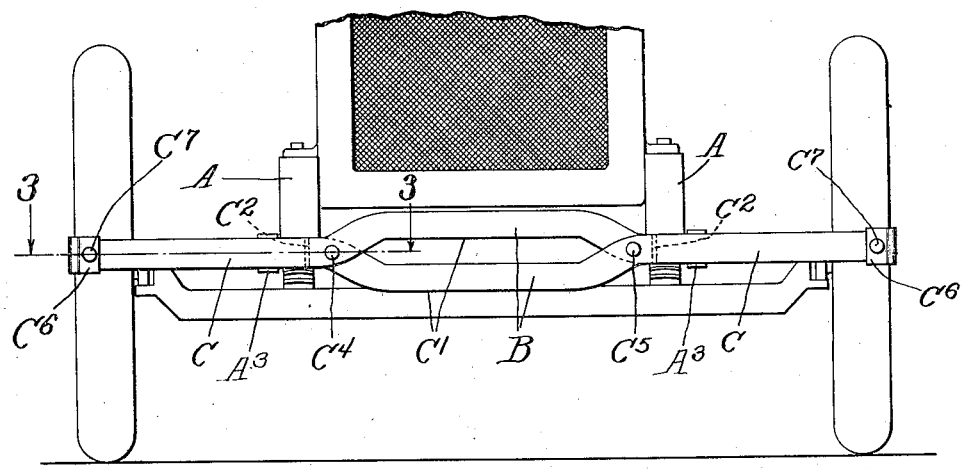
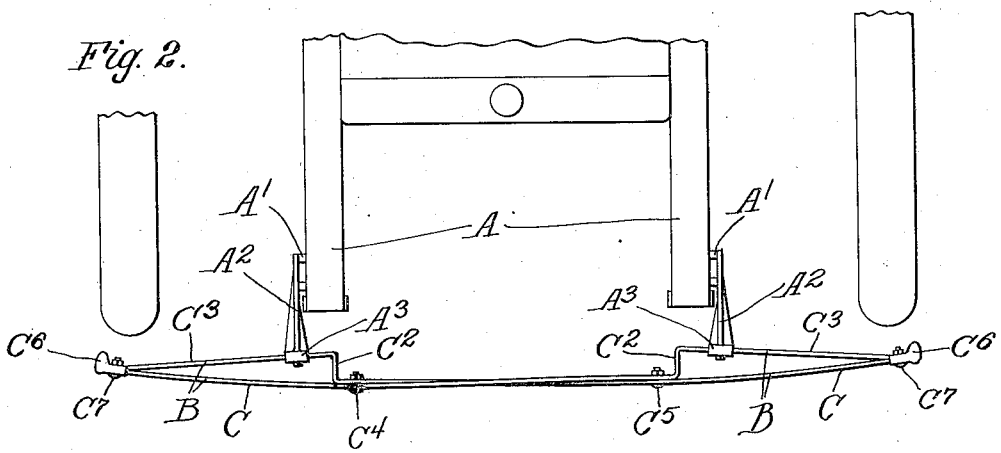
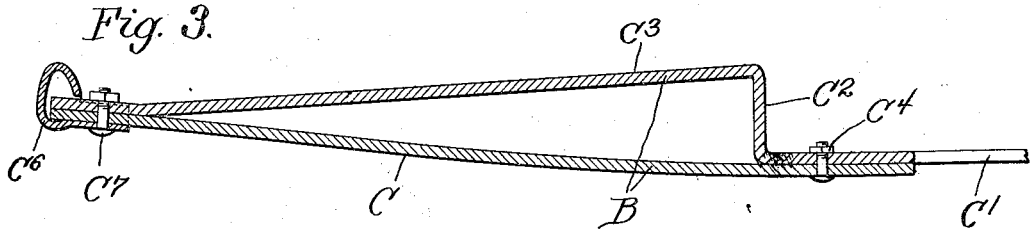
Witness
Edward T. Wray.
Inventor
Lewis P. Halladay
by Barber & Carter
Attorneys

UNITED STATES PATENT OFFICE.

LEWIS P. HALLADAY, OF DECATUR, ILLINOIS.

BUMPER-BAR.

1,377,340.　　　　Specification of Letters Patent.　　Patented May 10, 1921.

Application filed December 1, 1920. Serial No. 427,476.

*To all whom it may concern:*

Be it known that I, LEWIS P. HALLADAY, a citizen of the United States, residing at Decatur, in the county of Macon and State of Illinois, have invented a certain new and useful Improvement in Bumper-Bars, of which the following is a specification.

My invention relates to improvements in automobile bumper bars, and has for one object to provide a new and improved type of bumper bar in which two reinforcing spring strips are used, and in which they form a part of the length of the bumper. The width of the bumper measured in a vertical direction is greater than the normal width of the spring strips of which it is made. Another object is to provide a so-called duplex automobile bumper bar which shall be light, durable and little likely to break down.

Other objects of my invention, will appear from time to time in the specifications.

I illustrate my invention more or less diagrammatically in the accompanying drawings, wherein:

Figure 1 is a front view of an automobile showing my bumper in place.

Fig. 2 is a plan view of the front end of an automobile and bumper.

Fig. 3 is a section along the line 3—3 of Fig. 1.

Like characters are illustrated by like letters throughout the specification.

A A are the front frame horns of an automobile frame. $A^1$ $A^1$ are bumper supporting brackets attached to said horns. $A^2$ $A^2$ are bumper supporting bars projecting from the brackets. $A^3$ $A^3$ are bumper bar supporting yokes carried upon said arms adapted to engage the rear member of a spring bumper bar and hold it in place.

B B are identical spring bumper bar elements. It will be noted that they are exactly the same in size, shape and dimensions, so that when the two of them are reversed with respect one to another, they may be put together to form the bumper bar which I have shown.

Each of these spring elements is made up of a generally flat but slightly rearwardly curved front member C of such length as to extend throughout about one third of the total width. In addition to this there is a central portion $C^1$ downwardly or upwardly bent as the case may be from the portion C extending across about another third of the length. This portion $C^1$ terminates in a perpendicularly and rearwardly extending portion $C^2$ from which projects a back piece $C^3$.

When assembled these two elements are bolted together by means of the two interior bolts $C^4$ $C^5$ located at the points where the central portions bend upwardly or downwardly as the case may be, from the end portions. $C^6$ $C^6$ are bumper tips or sockets located one at either end of the bumper bar and the free end of the bumper springs are held in place in said sockets by the bolts $C^7$ $C^7$.

It will be noted that with the two identical bar forming members, they can be interlocked so that the front portion of the bumper at one end is made out of the same bar as the rear portion at the other end and vice versa. The two bars are therefore entwined and bolted together and this results in producing a peculiarly rigid and durable structure, and one in which sudden distortion cannot result in separating or disassociating the parts.

While it is evident that what I have shown is an operative device, still many changes might be made in size, shape and arrangement of parts without departing from the spirit of my invention.

What I claim is:—

1. An automobile bumper having a central portion comprising two flat spring elements arranged one above the other in a vertical plane and end portions comprising two flat spring elements arranged one behind the other in a horizontal plane.

2. An automobile bumper having a central portion comprising two flat spring elements arranged one above the other in a vertical plane and end portions comprising two flat spring elements arranged one behind the other in a horizontal plane, means engaging the rear of each of said two elements to attach the bumper to the vehicle.

3. An automobile bumper having a central portion comprising two flat spring elements arranged one above the other in a vertical plane and end portions comprising two flat spring elements arranged one behind the other in a horizontal plane, the rear spring element engaging the forward spring element at the ends of the bumper and diverging therefrom toward the center.

4. An automobile bumper having a central portion comprising two flat spring elements arranged one above the other in a vertical plane and end portions comprising two flat spring elements arranged one behind the other in a horizontal plane, the rear spring element engaging the forward spring element at the ends of the bumper and diverging therefrom toward the center, the spring element being bent at right angles to the bumper at the end of such diverging element to engage the front element.

5. An automobile bumper having a central portion comprising two flat spring elements arranged one above the other in a vertical plane and end portions comprising two flat spring elements arranged one behind the other in a horizontal plane, said spring elements being rigidly and permanently fastened together at their extreme ends and at the outer limits of the central portion only.

6. An automobile bumper having a central portion comprising two flat spring elements arranged one above the other in a vertical plane and end portions comprising two flat spring elements arranged one behind the other in a horizontal plane, the flat spring elements being arranged to intersect at the two ends of the central portion.

7. An automobile bumper having a central portion comprising two flat spring elements arranged one above the other in a vertical plane and end portions comprising two flat spring elements arranged one behind the other in a horizontal plane, said spring elements being rigidly and permanently fastened together at their extreme ends and at the outer limits of the central portion only, the flat spring elements being arranged to intersect at the two ends of the central portion.

8. An automobile bumper having a central portion comprising two flat spring elements arranged one above the other in a vertical plane and end portions comprising two flat spring elements arranged one behind the other in a horizontal plane, said spring elements being rigidly and permanently fastened together at their extreme ends and at the outer limits of the central portion only, the flat spring elements being arranged to intersect at the two ends of the central portion, at the point where the elements are fastened together.

9. An automobile bumper having a central portion comprising two flat spring elements arranged one above the other in a vertical plane and end portions comprising two flat spring elements arranged one behind the other in a horizontal plane, said spring elements being rigidly and permanently fastened together at their extreme ends and at the outer limits of the central portion only, the flat spring elements being arranged to intersect at the two ends of the central portion, at the point where the elements are fastened together, the end portions of the bumper being triangular in shape, the apex of the triangles being at the ends of the bumper, the bases of the triangles being located intermediate the ends thereof.

10. An automobile bumper having a central portion comprising two flat spring elements arranged one above the other in a vertical plane and end portions comprising two flat spring elements arranged one behind the other in a horizontal plane, said spring elements being rigidly and permanently fastened together at their extreme ends and at the outer limits of the central portion only, the flat spring elements being arranged to intersect at the two ends of the central portion, at the point where the elements are fastened together, the end portions of the bumper being triangular in shape, the apex of the triangles being at the ends of the bumper, the bases of the triangles being located at the outer limit of the central portion of the bumper.

11. An automobile bumper having a central portion comprising two flat spring elements arranged one above the other in a vertical plane and end portions comprising two flat spring elements arranged one behind the other in a horizontal plane, said spring elements being rigidly and permanently fastened together at their extreme ends and at the outer limits of the central portion only, the flat spring elements being arranged to intersect at the two ends of the central portion, at the point where the elements are fastened together, the end portions of the bumper being triangular in shape, the apex of the triangles being at the ends of the bumper, the bases of the triangles being located intermediate the ends thereof, and means engaging the rear arm of each triangle to attach the bumper to a vehicle.

12. An automobile bumper having a central portion comprising two flat spring elements arranged one above the other in a vertical plane and end portions comprising two flat spring elements arranged one behind the other in a horizontal plane, said spring elements being rigidly and permanently fastened together at their extreme ends and at the outer limits of the central portion only, the flat spring elements being arranged to intersect at the two ends of the central portion, at the point where the elements are fastened together, the end portions of the bumper being triangular in shape, the apex of the triangles being at the ends of the bumper, the bases of the triangles being located at the outer limit of the central portion of the bumper, and means engaging the rear arm of each triangle to attach the bumper to a vehicle.

13. A bumper comprising two identical flat spring elements, each element having a central portion bent vertically out of line with the two end portions, each of the end portions being bent first rearwardly and then laterally.

14. A bumper comprising two identical flat spring elements, each element having a central portion bent vertically out of line with the two end portions, each of the end portions being bent first rearwardly and then laterally, the bumper being thus made up of two such identical elements reversed with respect one to the other and attached rigidly together at their ends and adjacent the points where they are bent backward.

15. A bumper for automobiles and the like comprising two similar flat spring bars each of said bars comprising at one end a straight portion, at the center a portion located in the same plane as the straight portion but bent to one side thereof, though parallel therewith at the other end terminating in a rearwardly and then laterally bent member, said separate spring bars being reserved each with respect to the other so that they form together a composite bumper bar wider in a vertical direction at the center than at the ends, means for holding these bars together at their two ends and at two separate places intermediate their ends.

16. A bumper for automobiles including at its central portion two spring members arranged side by side and one above the other and at its ends two spring portions arranged one behind the other and spaced apart at the ends of the central portion and converging to join together at the extreme ends of the bumper.

17. A bumper comprising two identical flat spring elements, each element having a central portion bent vertically out of line with the two end portions, each of the end portions being bent first rearwardly and then laterally, the bumper being thus made up of two such identical elements reversed with respect one to the other and attached rigidly together at their ends and adjacent the points where they are bent backward, the end portion of one element being at the front of one end of the bumper, the end portion of the other element being at the front, at the opposite end of the bumper.

18. An automobile bumper comprising two spring elements having central portions arranged one above the other in a vertical plane, and end portions comprising flat spring elements, arranged one behind the other in a horizontal plane.

19. An automobile bumper comprising two spring elements having central portions arranged one above the other in a vertical plane, and end portions comprising flat spring elements, arranged one behind the other in a horizontal plane, the end portion of one element being placed at the front of one end of the bumper and the end portion of the other element being placed at the front of the opposite end.

20. An automobile bumper comprising two spring elements each having a central portion bent vertically out of line with its two end portions, the two elements being so interlocked that the end portion of one element is behind the end portion of the other element at one end of the bumper and in front of it at the opposite end of the bumper.

21. An automobile bumper comprising two spring elements each having a central portion bent vertically out of line with its two end portions, the two elements being so interlocked that the end portion of one element is behind the end portion of the other element at one end of the bumper and in front of it at the opposite end of the bumper, the two elements being rigidly secured adjacent their ends and adjacent the points where they are bent out of line.

Signed at Chicago county of Cook and State of Illinois, this 29th day of November 1920.

LEWIS P. HALLADAY.